US012785241B2

(12) United States Patent
Javanbakht et al.

(10) Patent No.: US 12,785,241 B2
(45) Date of Patent: Nov. 3, 2026

(54) EMBEDDED WILKINSON POWER DIVIDER WITH RESISTIVE FOIL WITHIN MULTI-LAYER PRINTED CIRCUIT BOARD

(71) Applicant: Sanmina Corporation, San Jose, CA (US)

(72) Inventors: Nima Javanbakht, Ottowa (CA); Iftikhar Ahmed, Ottowa (CA); Michael Cooper, Ottowa (CA)

(73) Assignee: SANMINA CORPORATION, San Jose, CA (US)

( * ) Notice: Subject to any disclaimer, the term of this patent is extended or adjusted under 35 U.S.C. 154(b) by 159 days.

(21) Appl. No.: 18/673,053

(22) Filed: May 23, 2024

(65) Prior Publication Data

US 2025/0316878 A1 Oct. 9, 2025

Related U.S. Application Data

(60) Provisional application No. 63/575,986, filed on Apr. 8, 2024.

(51) Int. Cl.

*H01P 5/19* (2006.01)
*H01P 3/02* (2006.01)
*H01P 5/16* (2006.01)

(52) U.S. Cl.

CPC ................ *H01P 5/16* (2013.01); *H01P 3/026* (2013.01); *H01P 5/19* (2013.01)

(58) Field of Classification Search

CPC ...... H01P 5/12; H01P 5/16; H01P 5/19; H01P 5/20; H01P 3/026; H03H 7/48; H03H 7/482

(Continued)

(56) References Cited

U.S. PATENT DOCUMENTS 4,367,445 A 1/1983 Dydyk
7,164,903 B1 1/2007 Cliff et al.

(Continued)

FOREIGN PATENT DOCUMENTS

EP 3483981 A1 5/2019
EP 3958463 A1 2/2022
GB 2170358 A 7/1986

OTHER PUBLICATIONS

Sun et al. "Broadband Folded Wilkinson Power Combiner/Splitter." IEEE Microwave and Wireless Components Letters, vol. 14, No. 6 (Jun. 2004).

(Continued)

*Primary Examiner* — Stephen E. Jones

(74) *Attorney, Agent, or Firm* — Tyler J. Barrett; LOZA & LOZA, LLP

(57) ABSTRACT

A Wilkinson power divider is embedded in a multi-layer printed circuit board (PCB). In one example, the power divider is configured as an embedded coplanar waveguide with ground (CPWG) device. In another example, the embedded Wilkinson power divider is configured using striplines. In both examples, a resistive foil is used as the isolation resistor of the Wilkinson power divider. In some examples, the two arms of the Wilkinson power divider have semi-oval shapes. The device may be configured to provide a wide impedance bandwidth (e.g., in the range of 24-31 GHz) with minimal return loss and insertion loss. Cascaded configurations are also described herein.

19 Claims, 7 Drawing Sheets

(58) Field of Classification Search
USPC .......................................................... 333/125
See application file for complete search history.

(56) References Cited

U.S. PATENT DOCUMENTS

| | | | | |
|---|---|---|---|---|
| 8,063,716 | B1 | 11/2011 | Ives | |
| 9,570,792 | B1 | 2/2017 | Derbyshire | |
| 10,367,256 | B2 | 7/2019 | Edenfield et al. | |
| 10,742,176 | B2 | 8/2020 | Suravarapu et al. | |
| 11,322,815 | B2 | 5/2022 | Winslow | |
| 2004/0252059 | A1* | 12/2004 | Zaghloul | H01Q 9/0414<br>343/700 MS |
| 2017/0005416 | A1* | 1/2017 | Gendron | H01Q 1/02 |
| 2018/0011180 | A1* | 1/2018 | Warnick | H01Q 21/064 |
| 2018/0294777 | A1* | 10/2018 | Yang | H03F 3/211 |
| 2019/0140362 | A1* | 5/2019 | Edenfield | H01Q 21/24 |
| 2022/0070997 | A1 | 3/2022 | Clark et al. | |
| 2022/0166122 | A1* | 5/2022 | Varonen | H01L 23/66 |
| 2023/0187826 | A1* | 6/2023 | Lear | H03H 7/1775<br>343/700 R |

OTHER PUBLICATIONS

Chieh, J. S. et al. "Development of a broadband Wilkinson power combiner on Liquid Crystal Polymer," 2009 Asia Pacific Microwave Conference, 2009, pp. 2068-2071.
Srisathit, K. et al., "Miniature Wilkinson Divider and Hybrid, Coupler with Harmonic Suppression, Using T-Shaped Transmission Line," 2007 Asia-Pacific Microwave Conference, 2007, pp. 1-4.
Wang, Y. X. et al., "A New Broadband Miniature RF Power Splitter," 2008 IEEE MTT-S International Microwave Workshop Series on Art of Miniaturizing RF and Microwave Passive Components, 2008, pp. 180-182.
Gillani, Y. et al., "A Wideband CPW-based 4-way Wilkinson Power Divider for X-band Applications," 2021 1st International Conference on Microwave, Antennas & Circuits (ICMAC), 2021, pp. 1-3.
Kother, D. et al., "MMIC Wilkinson couplers for frequencies up to 110 GHz," Proceedings of 1995 IEEE MTT-S International Microwave Symposium, vol. 2, 1995, pp. 663-666.
Weerthunge, N. et al., "A Miniaturized Wilkinson Power Divider for MMIC Applications," 2021 IEEE Asia-Pacific Microwave Conference (APMC), 2021, pp. 1-3.
Platt, D. et al., "Integrated 79 GHz UWB automotive radar front-end based on Hi-Mission MCM-D silicon platform," International Journal of Microwave and Wireless Technologies, vol. 2, No. 3-4, 2010, pp. 325-332.
Hallberg, W. et al., "A Generalized 3-dB Wilkinson Power Divider/Combiner With Complex Terminations," in IEEE Transactions on Microwave Theory and Techniques, vol. 66, No. 10, Oct. 2018, pp. 4497-4506.
Love, M. et al., "A Compact 5 GHz Lumped-Element Wilkinson Power Combiner on 28 nm Bulk CMOS," 2018 25th IEEE International Conference on Electronics, Circuits and Systems (ICECS), 2018, pp. 441-444.
Lee, S. et al., "Millimeter-Wave Multi-Band Reconfigurable Differential Power Divider for 5G Communication," in IEEE Transactions on Microwave Theory and Techniques, vol. 70, No. 1, Jan. 2022, pp. 886-894.
Omi, A. I. et al., "A Novel Analytical Design Technique for a Wideband Wilkinson Power Divider Using Dual-Band Topology," Sensors, vol. 21, No. 19, Sep. 2021, p. 6330.
Ercoli, M. et al., "Small size high isolation Wilkinson power splitter for 60 GHz wireless sensor network applications," 2011 IEEE 11th Topical Meeting on Silicon Monolithic Integrated Circuits in RF Systems, 2011, pp. 85-88.
Carchon, G. et al., "Integrated Wilkinson Power Dividers in C-, Ku- and Ka-Band in Multi-Layer Thin-Film MCM-D," 2000 30th European Microwave Conference, 2000, pp. 1-4.

* cited by examiner

EMBEDDED WILKINSON POWER DIVIDER WITH RESISTIVE FOIL WITHIN MULTI-LAYER PRINTED CIRCUIT BOARD

CROSS-REFERENCE TO RELATED APPLICATIONS

This application claims priority to and the benefit of U.S. Provisional Patent Application No. 63/575,986, filed on Apr. 8, 2024 entitled, "EMBEDDED WILKINSON POWER DIVIDER IN MULTI-LAYERS PRINTED CIRCUIT BOARD USING RESISTIVE FOIL," the entire content of which is incorporated herein by reference as if fully set forth below in its entirety and for all applicable purposes.

FIELD

Various features relate to printed circuit boards and more specifically to power dividers or splitters implemented on or within a multi-layer printed circuit board (PCB).

BACKGROUND

A Wilkinson power divider or power splitter is a particular type of power divider circuit or device that can provide isolation between its output ports while maintaining a matched condition on all of its ports. Wilkinson power dividers are used in the field of microwave engineering and circuit design. Radio frequency communication systems with multiple channels often use such devices because the high degree of isolation between the output ports can prevent crosstalk between the individual channels. Wilkinson power dividers can also be employed as power combiners because the devices are reconfigured with passive components and hence are reciprocal. Herein, improvements are provided to Wilkinson power dividers/splitters, particularly for use within high frequency communications systems where a very small device footprint is often required.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In accordance with some aspects of this disclosure, a multi-layer printed circuit board (PCB) is provided with an embedded Wilkinson power divider therein.

In one embodiment, a device is provided that includes a PCB with a Wilkinson power divider embedded in the PCB, wherein the Wilkinson power divider comprises embedded coplanar waveguides. The embedded coplanar waveguides may be implemented as an embedded coplanar waveguide with ground (CPWG) devices. The Wilkinson power divider may be a two-way power divider that includes a resistive foil as its isolation resistor. The resistive foil may have an ohms per square (OPS) resistance in the range of 25-200 OPS and, in one example, the resistive foil has an OPS of 50 OPS.

In another embodiment, a device is provided that includes a PCB and a Wilkinson power divider embedded in the PCB, where the Wilkinson power divider includes: an input trace; first and second output traces; a first curved non-circular trace coupling the input trace to the first output trace at a first trace junction; a second curved non-circular trace coupling the input trace to the second output trace at a second trace junction; and a resistive foil formed between the first and second trace junctions. In some aspects, all of the traces are striplines. In another aspect, all of the traces are waveguides and the Wilkinson power divider comprises an embedded CPWG device.

Among other advantages, the embedded Wilkinson power dividers described herein provide high isolation with low loss using a compact design with a small device footprint.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations, it should be understood that such implementations can be implemented in various devices, systems, and methods.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION OF THE INVENTION

Figure 1:
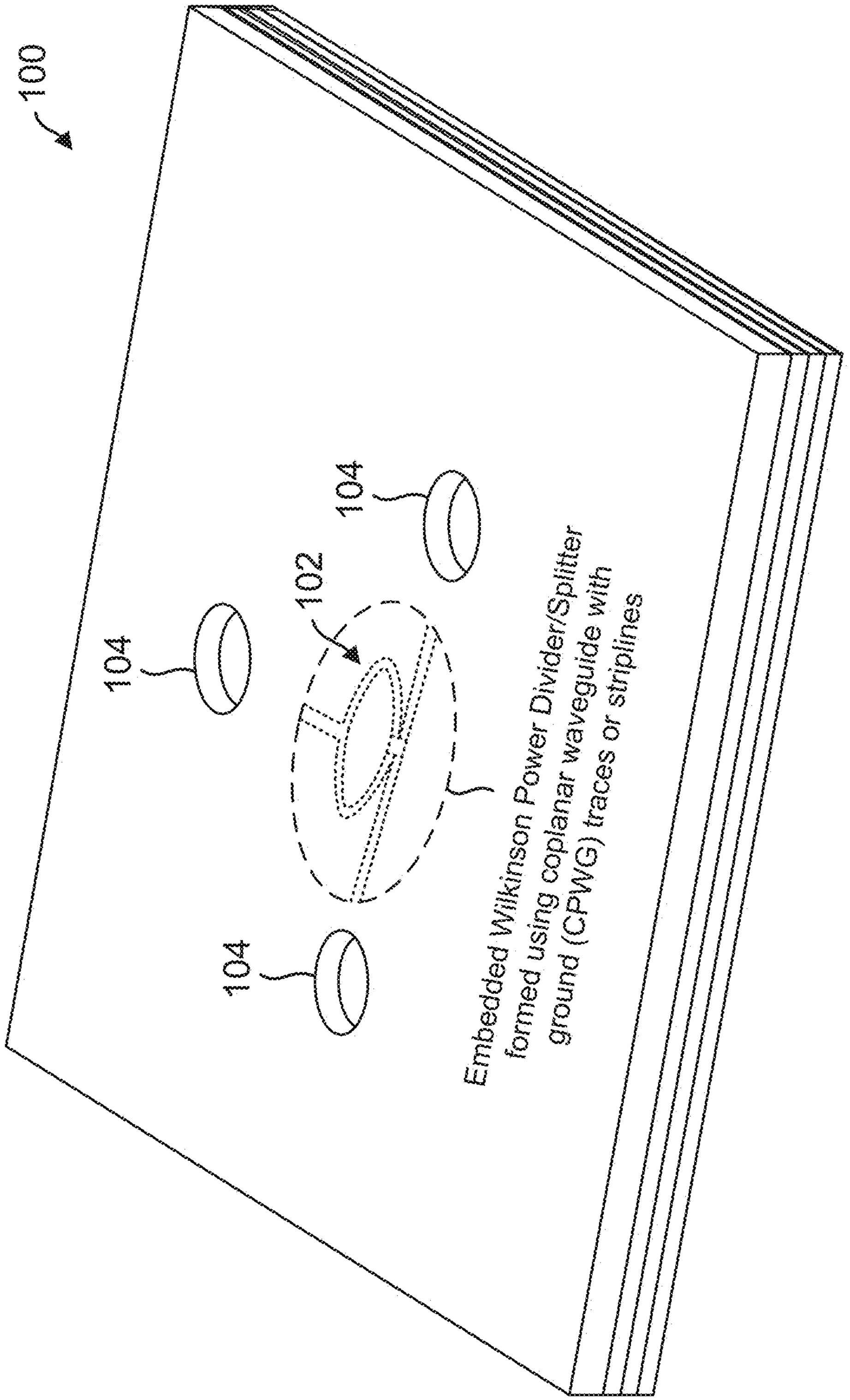
FIG. 1 is a simplified perspective of an exemplary multi-layer printed circuit board (PCB) with an embedded Wilkinson power divider in accordance with aspects of the disclosure.

In the following detailed description, numerous specific details are set forth in order to provide a thorough understanding of the different aspects. However, it will be understood by one of ordinary skill in the art that the different aspects may be practiced without these specific details. For example, well-known operations, structures and techniques may not be shown in detail in order not to obscure the different aspects presented herein.

RF communication systems with multiple channels often use Wilkinson power dividers (splitters) because the high degree of isolation achieved between the output ports can prevent crosstalk between the individual channels. Within high frequency RF communications systems (e.g., x-band to W-band), a very small device footprint is often required, which is difficult to achieve with conventional Wilkinson power dividers such as those implemented as microstrips formed on top of a PCB. Note that conventional Wilkinson power dividers often employ a discrete resistor as the balance resistor and many use a long transmission line (wavelength and frequency dependent lengths) to manipulate the resistance. Hence, the footprint of such devices is relatively large, which is undesirable in many telecommunications, RF, and electronic applications.

Herein, these and other issues are addressed by providing a Wilkinson power divider embedded within a PCB where, in one example, the Wilkinson power divider is configured using embedded coplanar waveguides. The embedded coplanar waveguides may be implemented as an embedded coplanar waveguide with ground (CPWG) devices within a multi-layer PCB. In another example, the embedded Wilkinson power divider is configured within a multi-layer PCB using striplines including: an input trace; first and second output traces; a first curved non-circular trace coupling the input trace to the first output trace at a first trace junction; a second curved non-circular coupling the input trace to the first output trace at a second trace junction; and a resistive foil formed between the first and second trace junctions. The curved non-circular traces may be configured as semi-ovals. The resistive foil may have an ohms per square (OPS) resistance in the range of 25-200 OPS and, in one example, the resistive foil has an OPS of about 50 OPS. In some aspects, the resistive foil is a Ticer™ resistive foil (attached to Rogers™ 4350 substrate) and may be formed by etching the copper cladding to create the isolation resistor of the Wilkinson power divider.

The Wilkinson power divider may be used, e.g., as a feed network in an array antenna and for distributing power equally to other RF components. In some examples, the Wilkinson power divider is implemented as a single-stage power divider that covers the frequency bands of 24-31 GHz with minimal return loss and insertion loss and effective isolation. Overall, compactness, wide band, low insertion loss, high isolation, and integration capability of the Wilkinson power divider can make it a suitable candidate for state-of-the art array antennas, beam formers, satellite communication devices, Vehicle to Everything Communication (V2X) devices, 5G, and 6G communications devices.

In the primary examples described herein, the Wilkinson power divider is implemented as a CPWG device formed using various waveguides (along with the resistive foil). In alternative implementations, the Wilkinson power divider may be implemented using striplines (along with the resistive foil). Herein, for the sake of generality, the term "trace" is used to refer to either waveguides or striplines in the PCB. Where appropriate, the term waveguide will be used when referring specifically to a CPWG embodiment. The term stripline may be used when specifically referring to a stripline embodiment. Also, herein, the terms divider and splitter may be used interchangeably.

Figure 2:
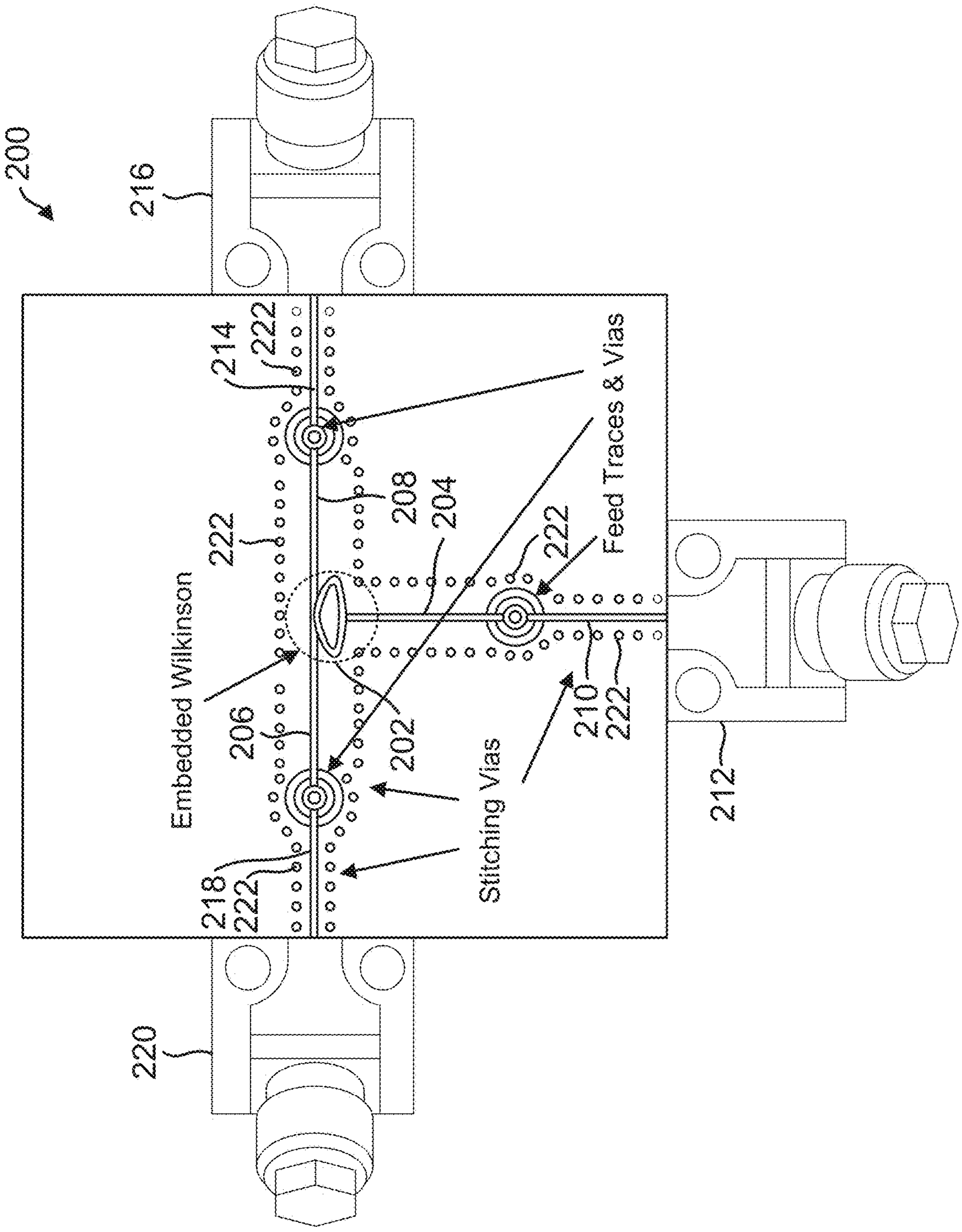
FIG. 2 is an exemplary top view of a multi-layer PCB in which a Wilkinson power divider is embedded in accordance with aspects of the disclosure.

FIG. 1 is a simplified perspective view of a multi-layer PCB 100 in which a Wilkinson power divider (splitter) 102 is embedded. The Wilkinson power divider 102 is shown in dotted lines since it is embedded in the PCB (e.g., in layer L2). As shown in FIG. 2, discussed below, the input and output traces of the Wilkinson power divider may include portions formed on the top of the PCB 100 (e.g., on layer L1) and other portions embedded within the PCB (e.g., in layer L2) with feed vias used to connect the top layer (L1) traces to the embedded traces (L2). As also shown in FIG. 2, stitching vias may be provided to fence off the Wilkinson power divider and its input/output traces. (The top layer connecting traces, feed vias, and stitching vias are not shown in FIG. 1.) Three antipads 104 are illustrated in FIG. 1. The antipads may be provided, e.g., to maintain the correct impedance in the input and output traces and to avoid shorts with other electrical components (not shown) on the PCB.

In one example, the PCB 100 may be 5-layer stack-up consisting of Rogers™ 4450 prepreg and Rogers™ 4350 core substrates to achieve a good performance in high frequency applications, while keeping the cost low. In other examples, the device may be implemented in other substrates with different dielectric constants and losses such as Isola™, Rogers™, Megtron™, or Elite-Material™ (EM) substrates.

FIG. 2 is a top view of a multi-layer PCB 200 in which a Wilkinson power divider (splitter) 202 is embedded (e.g., in L2). In FIG. 2, the embedded Wilkinson power divider 202 is shown along with an embedded input trace 204 (e.g., also in L2) and a pair of embedded output traces 206, 208 (e.g., also in L2). Additionally, the portions of the input and output traces formed on the top layer (e.g., L1) of the PCB 200 are shown, including: a top layer input trace 210 that couples embedded trace 204 (in L2) to an input coaxial RF connector 212; a first top layer output trace 214 that couples embedded output trace 208 (in L2) to a first coaxial RF output connector 216; and a second top layer trace output 218 that couples embedded trace 206 (in L2) to a second coaxial RF output connector 220. Feeding power to the Wilkinson power divider is achieved through the coaxial RF connector coupled to trace 210 on top of the board (L1), which is connected to the Wilkinson power divider at the inner layer (L2) through feed via transitions from the top (L1) to the inner layer (L2). Note that the RF connectors 212, 216, and 220 are shown in faint lines to emphasize that they are not part of the PCB.

As indicated in the drawing, a set of stitching vias 222 may be provided around embedded Wilkinson power divider 202 and around all of the traces, including the embedded traces and those on the top of L1. Antipads (shown in FIG. 1) may be provided, as already discussed, with the antipads formed around feed vias that connect the top level traces (on L1) to the embedded traces (on L2). To avoid coupling between the Wilkinson power divider and other components (not shown) on the PCB at high frequency (i.e., to isolate the Wilkinson power divider), a stitching blind via fence (L1-L3) may be used around the Wilkinson power divider and the feed traces to confine the electromagnetic fields. The use of stitching vias around the Wilkinson power divider 202 is particularly important, while the stitching vias around traces 210, 214, and 218 and the antipads/feed vias can be helpful as well. In one example, the size of PCB 200 (excluding the RF connectors) may be 614 mil×614 mil×53 mil. The Wilkinson power divider itself may have a footprint of 100 mil×80 mil, and be located on L2.

Figure 3:
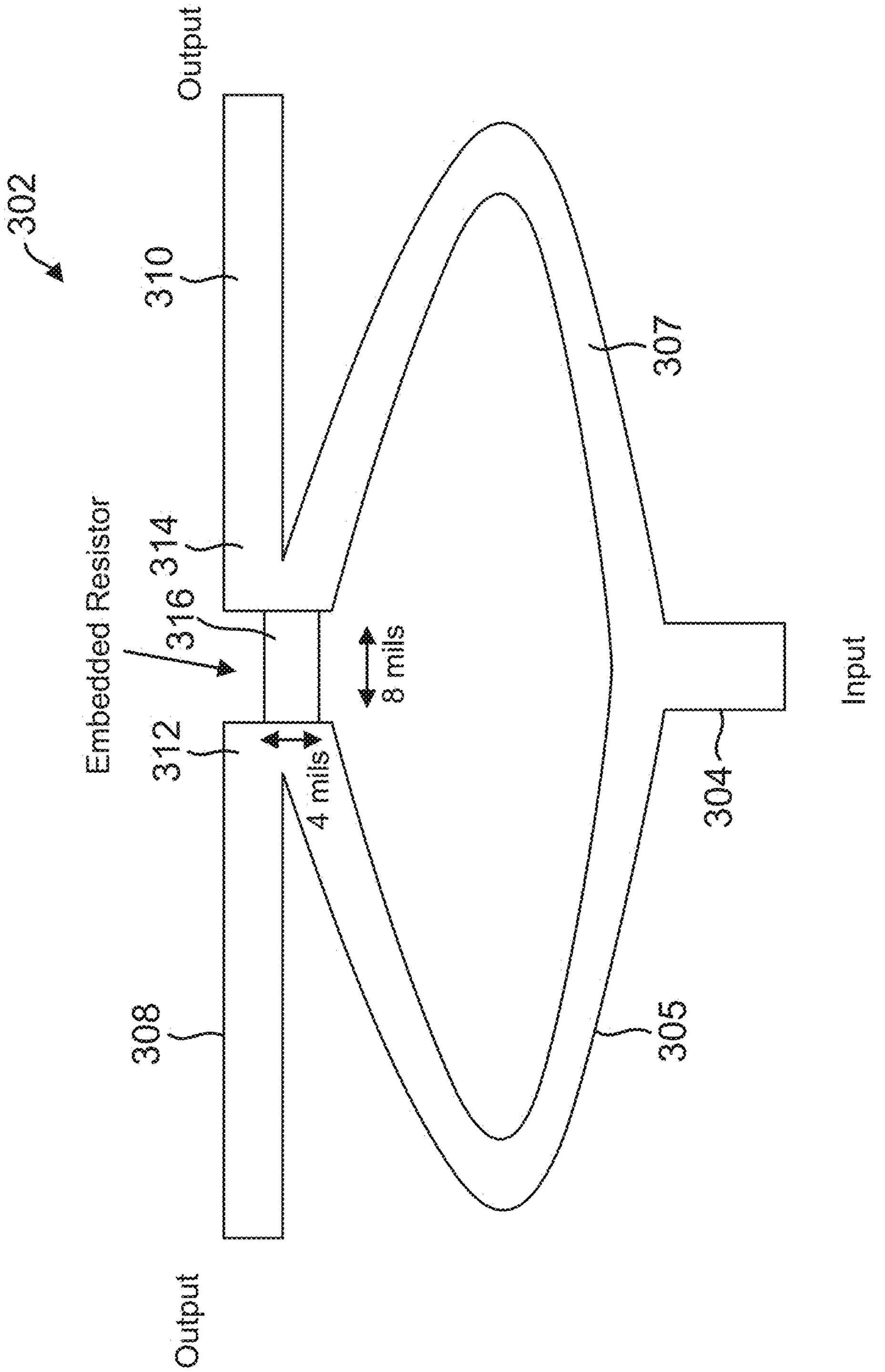
FIG. 3 illustrates just the embedded Wilkinson power divider of the multi-layer PCB, configured in accordance with aspects of the disclosure.

FIG. 3 illustrates an exemplary zoomed in view of an embedded Wilkinson power divider 302 showing only its embedded traces and the embedded resistive foil. As shown, the Wilkinson power divider 302 includes an input trace, which is coupled to a first non-circular intermediate arm 305 and a second non-circular intermediate arm 307, each of which has a curved shape that forms a non-circular arc (or a segment of a non-circular arc), and which also may be described as a segment of an oval (i.e., a semi-oval) or a segment of a ellipse. The shape of the arms 305, 307 is different from that of conventional Wilkinson power dividers, which often have circular (or semi-circular) arms. In other examples, the arms 305, 307 can have different shapes such as a semi-square ring.

The embedded Wilkinson power divider 302 includes a first output trace 308 and a second output trace 310, which are parallel with one another and perpendicular to the input trace 304 and which extend outwardly in opposite directions from a resistive foil 316. The first curved non-circular arm 305 connects to the first output trace 308 at a first trace junction 312. The second curved non-circular arm 307 connects to the second output trace 310 at a second trace junction 314. The embedded resistive foil 316 is formed directly between the first and second trace junctions 312, 314. In some examples, the resistive foil 316 is 4 mils by 8 mils. In some aspects, the resistive foil has an ohms per square (OPS) resistance in the range of 25-200 OPS and may be, for example, 50 OPS. The device may be configured to operate, for example, from 8 GHz to 110 GHz. In some examples, the Wilkinson power divider may be configured, e.g., to operate in the Ka-band for satellite communications.

Figure 4:
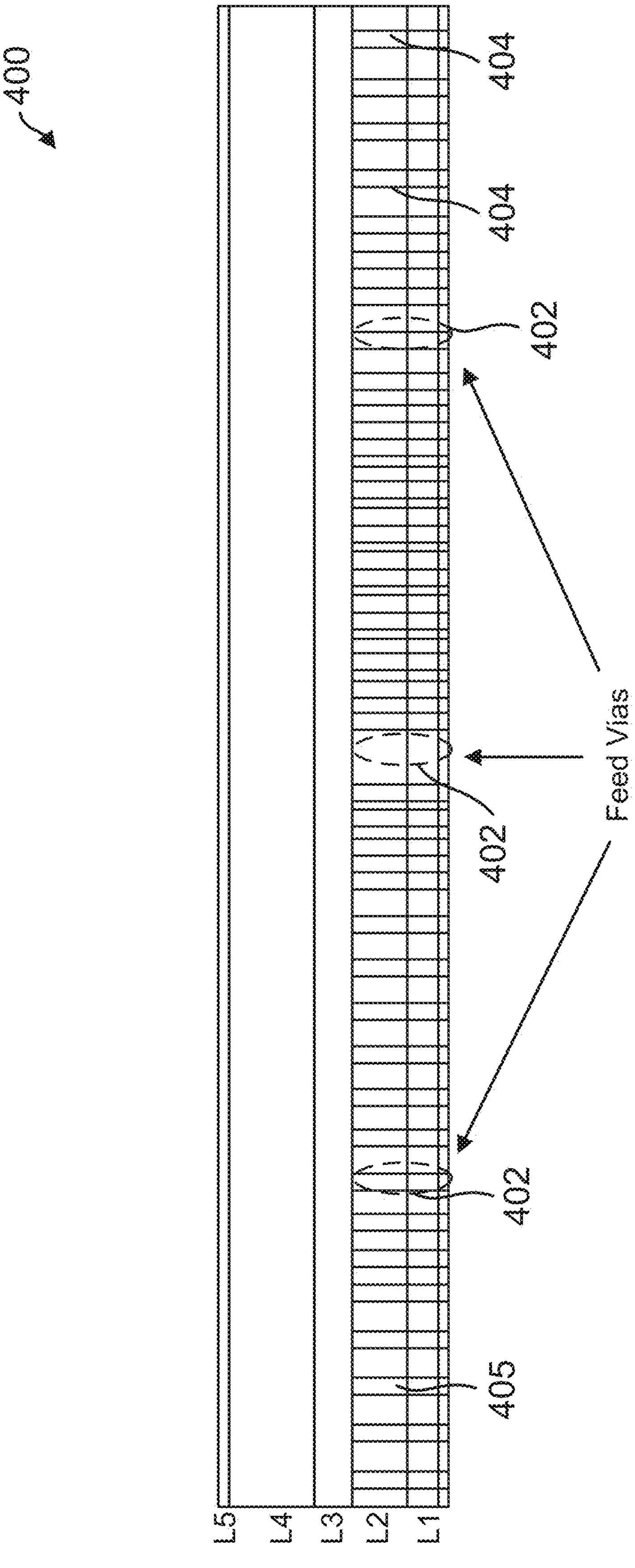
FIG. 4 provides a cross-sectional view of a PCB in which a Wilkinson power divider may be embedded and configured in accordance with aspects of the disclosure

FIG. 4 provides a cross-sectional view of a PCB 400, which may have a Wilkinson power divider (not shown) embedded therein. PCB 400 has five layers (e.g., L1-L5). The locations of three feed vias 402, from L1 to L3, are also shown. The other vias shown in the figure, indicated by reference numeral 404, are the various stitching vias. Exemplary thicknesses of the PCB are: L1-L2 (6.6 mil); L2-L3 (12 mil); L3-L4 (8 mil); and L4-L5 (20 mil). To make the fabrication easier and reduce costs (i.e., to reduce number of plating process), the feed vias and stitching vias are from L1 to L3. The L3 layer may be a solid conductive ground plane. The Wilkinson power divider, as explained, may be formed on L2. As such, the Wilkinson power divider may be considered to be a coplanar waveguide with ground (CPWG) structure with the conductive plane on L3 serving as the ground.

In other examples, the traces may be formed as striplines. That is, the embedded Wilkinson power divider may be configured using striplines rather than CPWG waveguides. The dimensions of the embedded Wilkinson power divider and the characteristics of the resistive foil may be different for a stripline configuration than that of a CPWG configuration. For example, to achieve the same operational characteristics (impendence bandwidth, isolation, etc.) for a stripline configuration may require a different resistance and a different shape/size for the power divider.

Note that the embedded Wilkinson power divider may be designed or configured as one of the fundamental blocks of a distributed feed network of a compact phased array antenna for a modern communication systems and beam-scanning application (e.g., navigation systems and V2V communications). The integration capability of the device makes the realization of compact antenna-in-package devices more easily achievable. In some examples, layers L3-L5 may be reserved for the antenna and other related components of the beam former. In some aspects, circular patches may be provided on layer L5 to serve as antennas, an artificial magnetic conductor (AMC) may be provided on L4, and the above-described solid conductive ground plane on L3 may be used and configured to achieve a relatively wide bandwidth with improved gain at mm-wave band.

Figure 5:
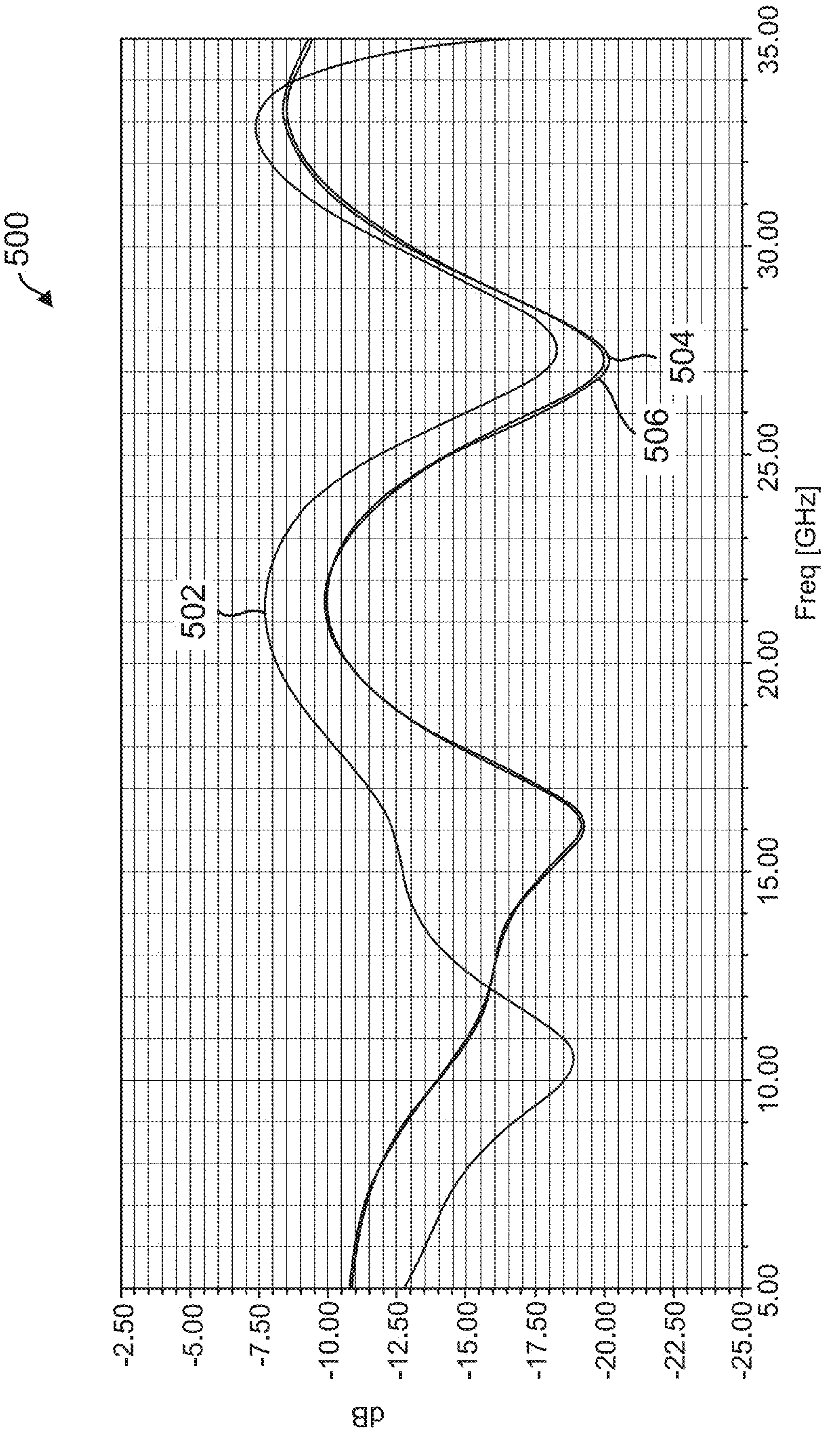
FIG. 5 is a graph illustrating $S_{11}$, $S_{22}$, and $S_{33}$ for an embedded Wilkinson power divider configured in accordance with aspects of the disclosure.
Figure 6:
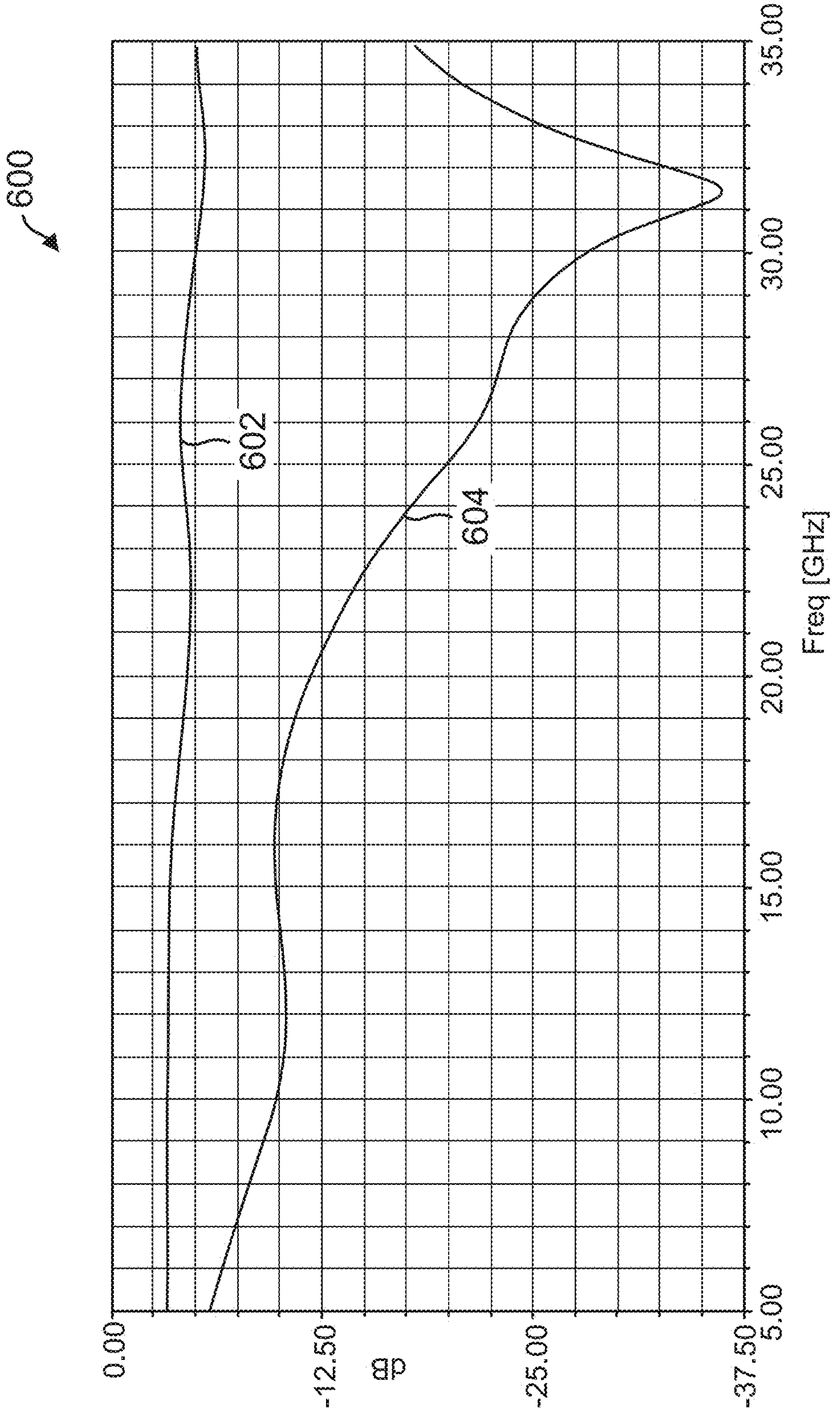
FIG. 6 is a graph illustrating $S_{21}$ (representing the insertion loss) and $S_{32}$ (representing isolation) for an embedded Wilkinson power divider configured in accordance with aspects of the disclosure.

FIGS. 5 and 6 illustrate simulations on the Wilkinson power divider of FIGS. 1-4 carried out using Ansys™ High Frequency Simulation Software. More specifically, FIG. 5 is a graph 500 illustrating $S_{11}$, $S_{22}$, and $S_{33}$ of the embedded Wilkinson power divider. Curve 502 represents $S_{11}$ and indicates the input return loss (at the common port). Curve 504 represents $S_{22}$ and curve 506 represents $S_{33}$, which are the return losses at the two outputs, respectively. Note $S_{22}$ and $S_{33}$ are nearly identical (due to the symmetry) and hence differ from one another only slightly in the figure. The x-axis shows frequency from 5 GHZ to 35 GHZ. The y-axis shows dB from −25.0 to −2.5. As shown in FIG. 5, the Wilkinson power divider can have a wide impedance bandwidth of 24-31 GHz exiting from the input (common port) and 22-31.5 GHz from either of the outputs.

FIG. 6 is a graph 606 illustrating $S_{21}$ (representing the insertion loss) and $S_{32}$ (representing the isolation) of the embedded Wilkinson power divider. Curve 602 represents $S_{21}$ and curve 604 represents $S_{32}$. The x-axis shows frequency from 5 GHZ to 35 GHz. The y-axis shows dB from −37.5 to 0.0. It should be noted that the return loss, insertion loss, and isolation consider the effect of the via transition and the feed traces at the top to better emulate the actual device. The dimensions and other parameters of the device can be chosen based on theoretical calculations and simulations to achieve a wide impedance bandwidth (e.g., in the range of 24-31 GHZ), then various parameters and dimensions may be tuned to minimize the return loss and insertion loss ($S_{11}$ and $S_{21}$).

Further with regard to FIGS. 5 and 6, note that the outputs and input (common port) have slightly different resonance frequencies due to the fact that the isolation resistor (in this particular example: 100Ω) is not ideal. Impedance bandwidth can be improved by implementing two or more of power dividers in a series configuration (i.e., multi-stages Wilkinson power splitter).

Note that an ideal Wilkinson power divider may have an insertion loss of 3 dB and isolation of 40 dB. However, in practice, a conventional Wilkinson power divider in the high frequency domain has an insertion loss and isolation of 7 dB and 13 dB. In contrast, when using the embedded Wilkinson power dividers escribed herein, an improvement of 2.5 dB in overall loss may be achieved compared to a conventional Wilkinson power divider and an improvement of 15 dB in overall isolation may be achieved. Still further, note that the insertion loss values of FIG. 6 represent the loss from input connector 212 to output connectors 216 and 220 of FIG. 2. When considering only the insertion loss from input 204 to outputs 206 and 208, the improvement in loss compared to a conventional Wilkinson power divider may be even greater, e.g., greater than 2.5 dB.

Figure 7:
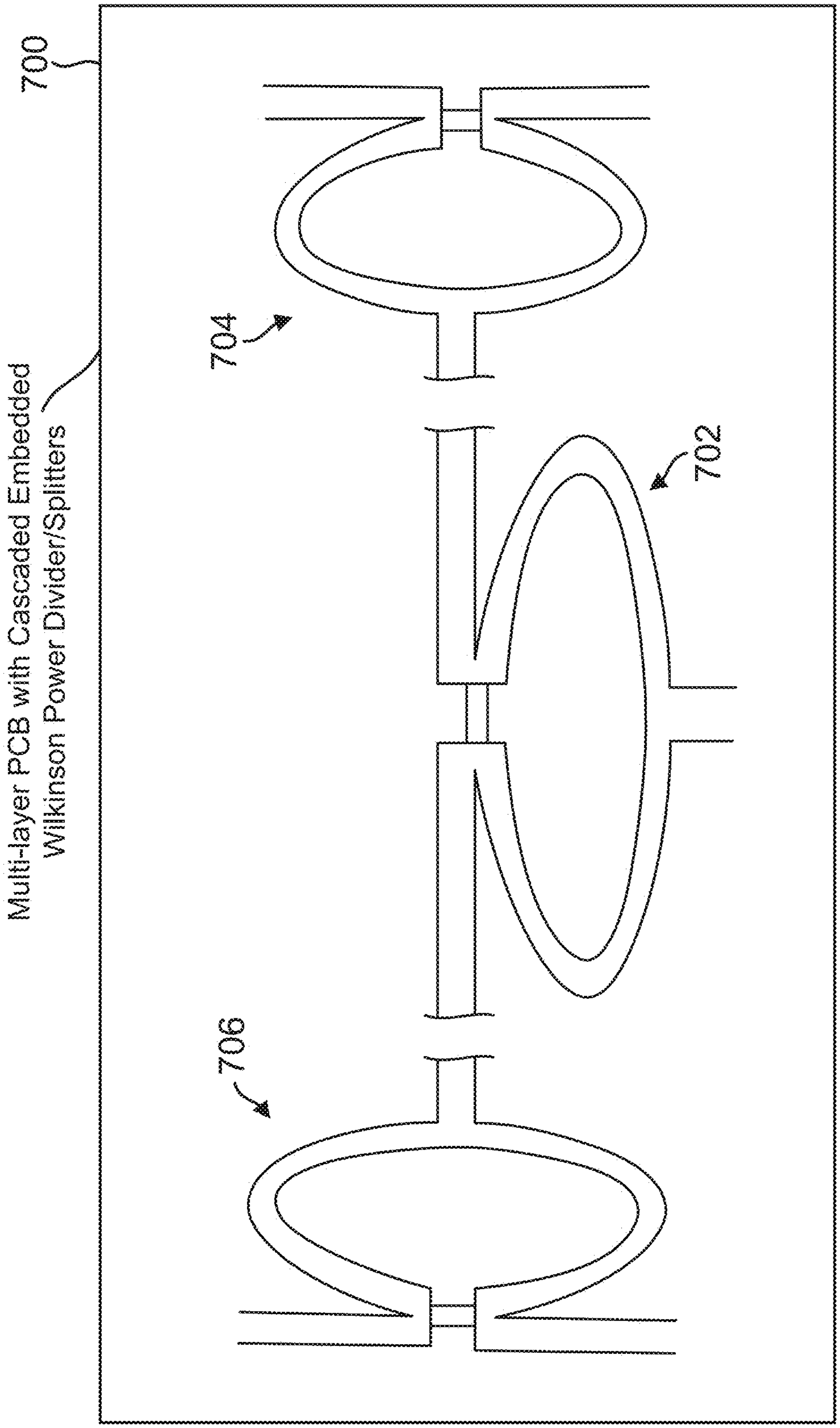
FIG. 7 illustrates a set of embedded Wilkinson power dividers in the multi-layer PCB arranged in a cascade configuration in accordance with aspects of the disclosure.

FIG. 7 illustrates an exemplary multistage/cascaded configuration. A multi-layer PCB 700 with cascaded embedded Wilkinson power divider/splitters is shown, which, in this example, includes three embedded Wilkinson power divider/splitters 702, 704, and 706. More can be provided. The cascaded configuration is useful in dividing the input power into more than two outputs equally. For example using three cascaded Wilkinson structures, as in FIG. 7, the input power can be divided into 4 equal parts (i.e., 1×4). Providing a cascaded Wilkinson power splitter in the same layer of a multi-layer PCB (rather than in different layers) can be more beneficial from loss and coupling point of view.

The embedded Wilkinson power dividers (splitters) described herein may be implemented, for example, as part a modern antenna array, antenna-in-package, and communication devices. The low-profile, wide impedance bandwidth, relatively low insertion loss, and integration capability of the disclosed Wilkinson power splitter make it a suitable candidate for the embedded power distribution network in the modern communication systems and antenna-in-package.

While certain exemplary embodiments have been described and shown in the accompanying drawings, such embodiments are merely illustrative of and not restrictive on the broad invention, and that this invention is not limited to the specific constructions and arrangements shown and described, since various other modifications may occur to those ordinarily skilled in the art.

The invention claimed is:

1. A device comprising:

a printed circuit board; and a Wilkinson power divider embedded in the printed circuit board, wherein the Wilkinson power divider comprises embedded coplanar waveguides and a resistive foil embedded within the printed circuit board and defined by etched copper cladding.

2. The device of claim 1, wherein the Wilkinson power divider is an embedded coplanar waveguide with ground (CPWG) device.

3. The device of claim 1, wherein the Wilkinson power divider is a two-way power divider.

4. The device of claim 1, wherein the resistive foil has an ohms per square (OPS) resistance in the range of 25-200 OPS.

5. The device of claim 1, wherein the resistive foil has an OPS of 50 OPS.

6. The device of claim 1, wherein the Wilkinson power divider comprises:

an input waveguide;

first and second output waveguides;

a first curved non-circular waveguide coupling the input waveguide to the first output waveguide at a first waveguide junction;

a second curved non-circular waveguide coupling the input waveguide to the second output waveguide at a second waveguide junction; and wherein the resistive foil is formed between the first and second waveguide junctions; and wherein the first and second output waveguides extend outwardly from the resistive foil in opposite directions, the first and second output waveguides extending parallel to each other and perpendicular to the input waveguide.

7. The device of claim 1, wherein the device further comprises one or more feed vias and one or more corresponding antipads formed in the printed circuit board.

8. The device of claim 1, wherein the device further comprises a plurality of stitching vias formed in the printed circuit board.

9. The device of claim 8, wherein the stitching vias enclose at least the Wilkinson power divider.

10. The device of claim 1, wherein the device is configured to operate from 8 GHz to 110 GHz.

11. The device of claim 1, wherein the Wilkinson power divider has a footprint no greater than 100 mil×80 mil.

12. A device comprising:

a printed circuit board; and a Wilkinson power divider embedded in the printed circuit board, wherein the Wilkinson power divider comprises:

an input trace;

first and second output traces;

a first curved non-circular trace coupling the input trace to the first output trace at a first trace junction;

a second curved non-circular trace coupling the input trace to the second output trace at a second trace junction; and a resistive foil formed between the first and second trace junctions;

wherein the traces are waveguides and the Wilkinson power divider comprises an embedded coplanar waveguide with ground (CPWG) device.

13. The device of claim 12, wherein the resistive foil has an ohms per square (OPS) resistance in the range of 25-200 OPS.

14. The device of claim 13, wherein the resistive foil has an OPS of 50 OPS.

15. The device of claim 12, wherein the device further comprises one or more feed vias and one or more corresponding antipads formed in the printed circuit board.

16. The device of claim 12, wherein the device further comprises a plurality of stitching vias formed in the printed circuit board.

17. The device of claim 16, wherein the stitching vias enclose at least the Wilkinson power divider.

18. The device of claim 12, wherein the device is configured to operate from 8 GHz to 110 GHz.

19. The device of claim 12, wherein the Wilkinson power divider has a footprint no greater than 100 mil×80 mil.

* * * * *